United States Patent [19]

Hollingsead

[11] 4,303,216
[45] Dec. 1, 1981

[54] RELEASABLE CLAMP ASSEMBLY
[75] Inventor: Robert A. Hollingsead, La Habra, Calif.
[73] Assignee: Hollingsead International, Inc., Santa Fe Springs, Calif.
[21] Appl. No.: 52,012
[22] Filed: Jun. 25, 1979
[51] Int. Cl.³ .............................................. F16L 3/08
[52] U.S. Cl. .............................. 248/74 PB; 24/16 PB; 24/274 R
[58] Field of Search ................ 248/74 PB; 24/16 PB, 24/73 PB, 73 PF, 274 R, 274 WB, 279, 68 B

[56] References Cited
U.S. PATENT DOCUMENTS

| 2,571,659 | 10/1951 | Bergstrom | 24/274 R |
|---|---|---|---|
| 3,214,809 | 11/1965 | Edwards | 24/274 WB X |
| 3,900,932 | 8/1975 | Allert | 24/274 R |
| 3,914,832 | 10/1975 | Petrus | 24/274 R |
| 3,924,308 | 12/1975 | Duprez | 24/274 R |
| 4,021,892 | 5/1977 | Piper | 24/274 R |
| 4,047,268 | 9/1977 | Buttriss | 24/16 PB X |
| 4,099,304 | 7/1978 | Luc | 24/274 R |
| 4,103,637 | 8/1978 | Luc | 24/274 R X |

Primary Examiner—J. Franklin Foss
Attorney, Agent, or Firm—Jackson, Jones & Price

[57] ABSTRACT

An avionic wire clamp assembly having a flexible strap member connected to a housing member is provided. The flexible strap member is adapted to coil about an object such as a wire bundle and to be relatively tightened by the rotation of a fastening member mounted within the housing member. The housing member is mounted within a flexible bracket that has been designed to permit a releasable relative movement with the housing member at a predetermined force to prevent an over tightening of the strap. One of the fastening member and housing member has a locking detent while the other has a complimentary tine for interengagement therewith to provide a lock position to prevent any unintentional release of the strap member.

44 Claims, 14 Drawing Figures

U.S. Patent   Dec. 1, 1981   Sheet 1 of 2   4,303,216
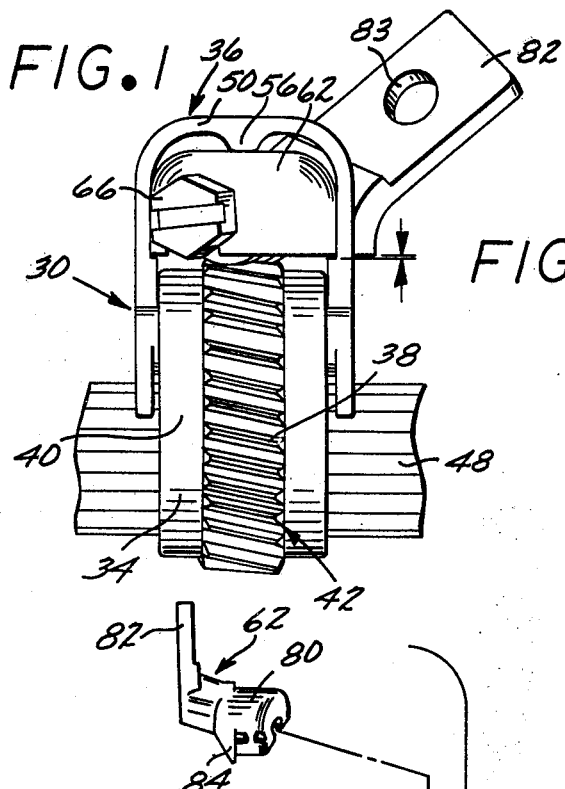
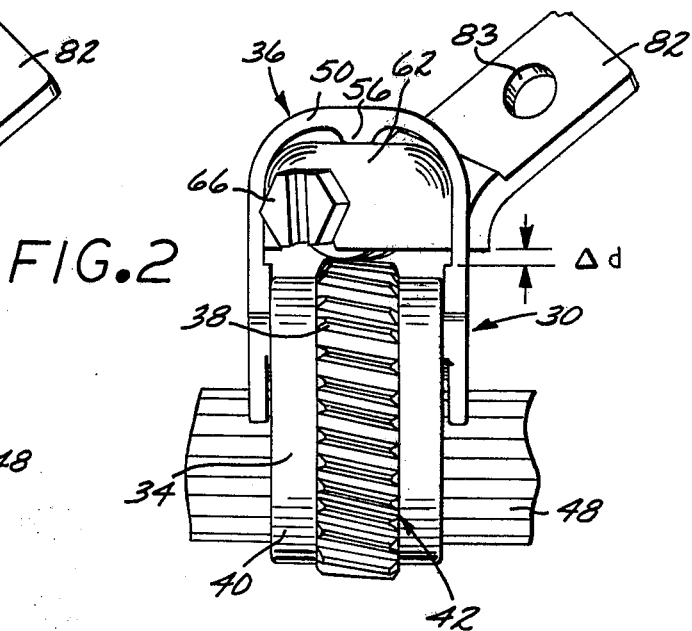
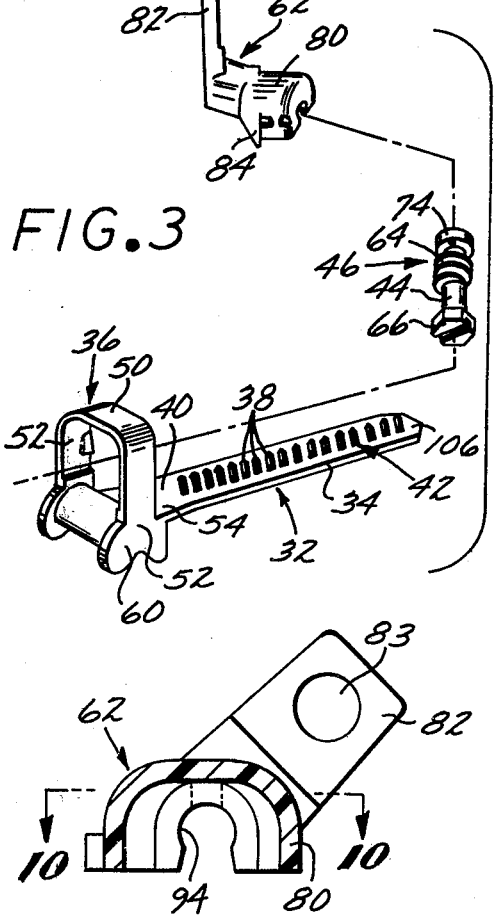
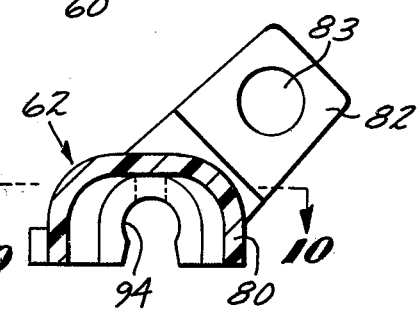
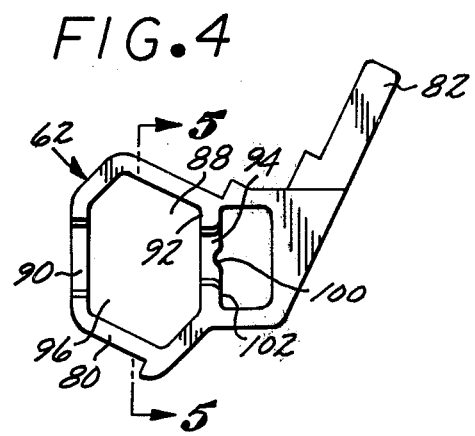
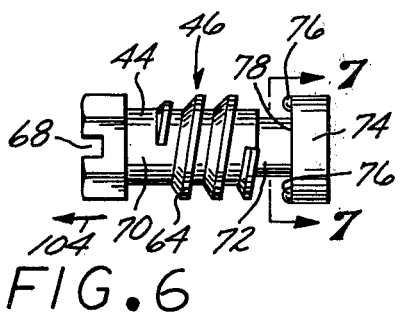
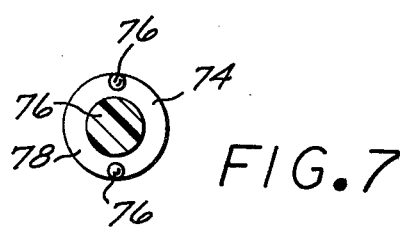

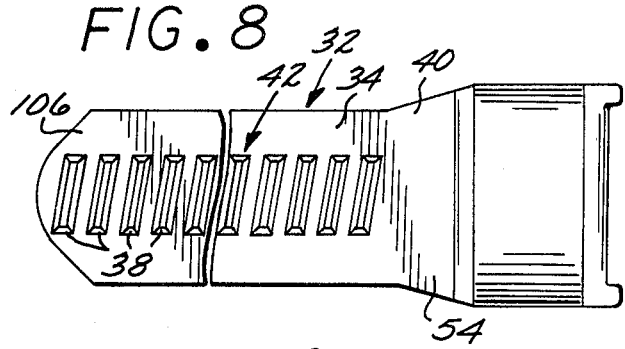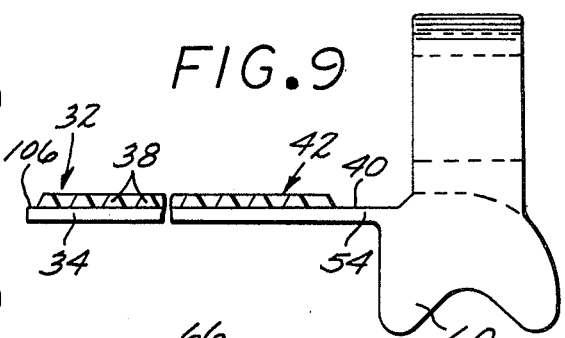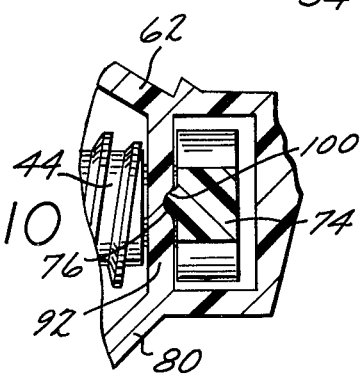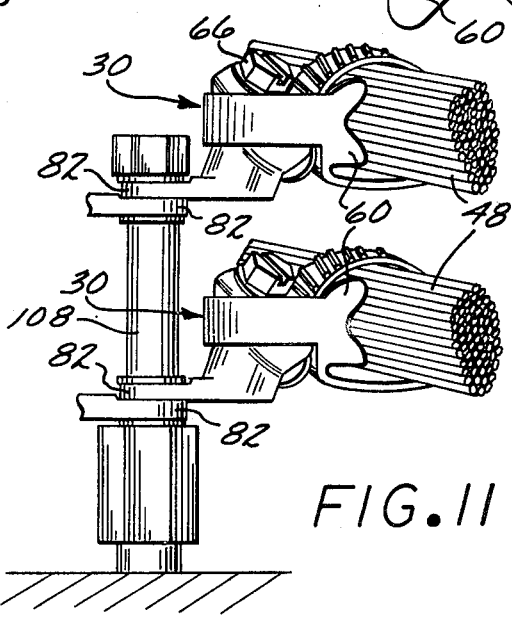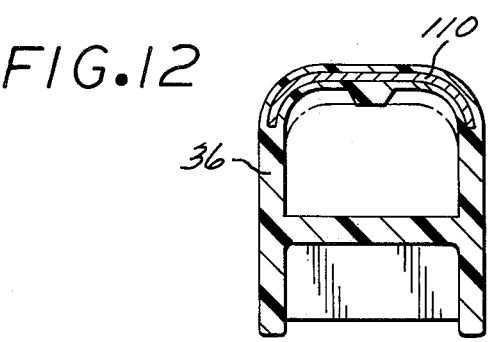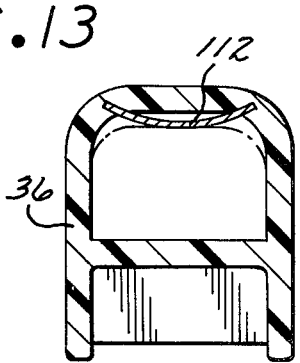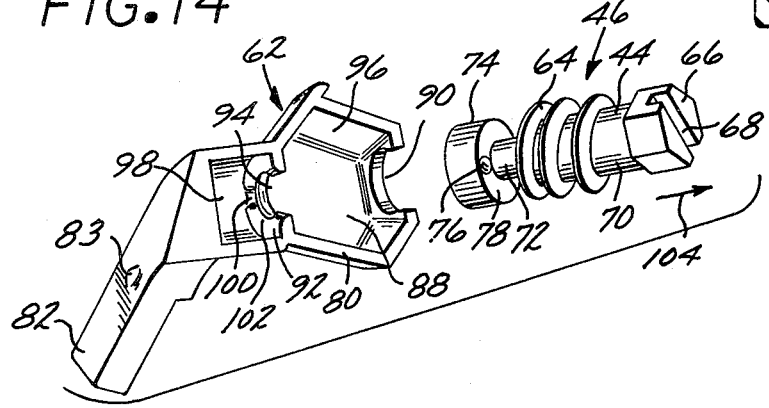

RELEASABLE CLAMP ASSEMBLY

BACKGROUND OF THE INVENTION

1. Field of the Invention

The present invention relates broadly to retainer assemblies for securing objects, particularly elongated objects and more particularly to a plastic avionic wire clamp assembly for providing a removable lightweight securement of aircraft electrical wires, cables and the like.

2. Description of the Prior Art

As can be readily appreciated by anyone familiar with the construction of commercial and military aircraft, the advent of highly sophisticated electronic equipment has greatly increased the wiring requirements of aircraft.

Aircraft wiring is presently supported by stainless steel aluminum loop type clamps that are provided with an elastomeric cushion. The main purposes of the elastomeric cushion are to prevent the wires from contacting the metal clamp band, to provide a high frictional surface between the wires and the band and to prevent wire bundle axial movement. Experience has proven that the elastomeric cushions are subject to damage from mechanical abuse near access areas, from hydrocarbon fluid attack, and from weather cracking such as a result of ozone oxidation. Frequently, the wires will contact the metal band which will result in failure of the wire installation. An exposed clamp band subject to vibration can cut through the installation of the wire during a flight causing damage with no chance of inspection. The result can range from a nuisance loss of a minor electrical circuit to a more serious loss of an important navigational system circuit or a control circuit on a fly by wire system. Fires can even be occasioned by short circuits which have damaged aircraft.

An additional drawback of the conventional avionic clamp assemblies is that they require installation in the airplane and cannot be preassembled outside of the plane. Usually, the individual wire clamps are mounted on a tree and if repair is required on a lower cable then the entire tree must be disassembled. Generally, these clamp assemblies are mounted on 18 inch spaces and their combined weight can be of relative significance with regards to the ultimate pay load of the plane. Additional problems associated with the conventional avionic wire clamps are that they can be subjectively tightened by a repairman to a distructive mode force and they are further capable of loosening under normal in-flight vibration.

Various forms of plastic cable ties are known in the patent literature such as U.S. Pat. No. 2,936,980, U.S. Pat. No. 2,955,328, U.S. Pat. No. 3,537,146, U.S. Pat. No. 3,570,497, U.S. Pat. No. 3,660,869, and U.S. Pat. No. 3,900,922. These patents are representative of a relatively crowded state of art. These references, however, do not offer a solution to the specific problems that are encountered in the hostile environment of aircraft nor to the ever present problem of the subjective capability of the operator to exert an excessive amount of force on the retained objects. Accordingly, the prior art is still seeking a solution to these general problems and more specifically a solution to the problems specifically encountered in the aircraft industry.

SUMMARY OF THE INVENTION

It is an object of the present invention to provide a retainer assembly which is self-locking into position to guard against unintentional release when an optimal degree of tightening around an object is attained.

It is another object of the present invention to provide a retainer assembly for objects and particularly for bundles of wire which is incapable of being over tightened by an operator whereby potential damage to the object is eliminated.

These and other objects and advantages are attained by a retainer assembly which has a holding member for extending around an object and a locking member for operatively engaging and adjustably tightening the holding member about the object.

The locking member is mounted within a housing member, and the housing member is operatively mounted within a flexible bracket. The flexible bracket provides for movement of the locking member relative to the holding member whenever a tightening force on the locking member exceeds a predetermined value. As a result of this movement, the locking member momentarily slips from operative engagement with the holding member, and over tightening of the holding member about the object is prevented.

The objects and features of the present invention are set forth in the appended claims. The present invention may be best understood by reference to the following description, taken in connection with the accompanying drawings in which like numerals indicate like parts.

BRIEF DESCRIPTION OF THE DRAWINGS

FIG. 1 is a front view of a first preferred embodiment of the retainer assembly of the present invention;

FIG. 2 is another front view of the first preferred embodiment of the retainer assembly of the present invention, the view showing a displacement of a locking member relative to a holding member;

FIG. 3 is an exploded perspective view of the first preferred embodiment of the retainer assembly of the present invention;

FIG. 4 is a bottom view of a housing member of the first preferred embodiment of the retainer assembly of the present invention;

FIG. 5 is a cross sectional view of the housing member of the first preferred embodiment of the retainer assembly of the present invention, the cross section being taken at lines 5—5 of FIG. 4;

FIG. 6 is a side view of the locking member of the first preferred embodiment of the retainer assembly of the present invention;

FIG. 7 is a cross sectional view of the locking member of the first preferred embodiment of the retainer assembly of the present invention, the cross section being taken at lines 7—7 of FIG. 6;

FIG. 8 is a top view of the holding member of the first preferred embodiment of the retainer assembly of the present invention;

FIG. 9 is a side view of the holding member of the first preferred embodiment of the retainer assembly of the present invention;

FIG. 10 is a partial cross sectional view of the housing member of the first preferred embodiment of the retainer assembly of the present invention, the housing member having the locking member mounted thereinto, the cross section being analogous to a cross section taken at lines 10—10 of FIG. 5;

FIG. 11 is a perspective view showing two retainer assemblies comprising the first preferred embodiments of the present invention, the retainer assemblies being mounted upon a vertically disposed assembly rod;

FIG. 12 is a cross sectional view of a holding member and a bracket member of a second preferred embodiment of the retainer assembly of the present invention, the bracket member incorporating a metal spring;

FIG. 13 is a cross sectional view of a holding member and a bracket member of a third preferred embodiment of the retainer assembly of the present invention, the bracket member incorporating a metal spring, and FIG. 14 is an exploded perspective view of the housing member and of the locking member of the first preferred embodiment of the present invention.

DESCRIPTION OF THE PREFERRED EMBODIMENT

The following specification taken in conjunction with the drawings sets forth the preferred embodiment of the present invention in such a manner that any person skilled in the avionic and plastic manufacturing arts can use the invention. The embodiments of the invention disclosed herein are the best modes contemplated by the inventor for carrying out his invention in a commercial embodiment, although it should be understood that various modifications can be accomplished within the parameters of the present invention.

Referring now to the drawings and particularly to FIGS. 1, 2 and 3 a first preferred embodiment of the retainer or harness clamp assembly 30 of the present invention is disclosed.

The retainer or harness clamp assembly 30 includes a holding member 32 which substantially comprises a flexible plastic belt 34. A flexible bracket 36 is integrally constructed with the flexible belt 34 of the holding member 32. Moreover, a plurality of parallel aligned, spaced protrusions or ridges 38 are integrally constructed with the flexible belt 34 on a first surface 40 thereof. The spaced protrusions or ridges comprise a thread or track 42 for engagement with a bolt or male screw 44 of a locking member 46.

For a more detailed description of the track 42 reference is made to FIGS. 8 and 9. These figures show that each protrusion or ridge 38 comprises an elongated member having a trapezoid shaped cross section. A general longitudinal axis of each elongated member describes an acute angle, somewhat less than 90%, with the general longitudinal axis of the flexible belt 34. The hereinbefore described configuration of the individual ridges 38 comprising the track 42 is designed to facilitate operative engagement with the locking member 46. It also facilitates momentary disengagement of the locking member 46 from the holding member 42 in order to prevent over tightening of the holding member 32 about an object such as a wire bundle 48, shown on FIGS. 1, 2 and 11.

Referring again to FIGS. 1, 2 and 3, the flexible bracket 36 of the first preferred embodiment of the retainer or harness clamp assembly 30 is disclosed in detail. The flexible bracket 36 essentially comprises a U shaped member 50, having two substantially parallel disposed portions or stems 52. These are attached to a first end 54 of the flexible belt 34. The first end 54 of the flexible belt 34 acts as a support base for the U shaped member 50. A protrusion or spacer 56, shown on FIGS. 1 and 2, projects downward from an intermediate portion 58 of the U shaped bracket 36. As is further described below, the flexible bracket 36 together with the spacer 56 coacts with the locking 46 and holding members 32 to prevent over tightening of the holding member 32 about the wire bundle 48.

A cradle configuration 60, shown on FIGS. 3, 9 and 11 is integrally molded with the flexible bracket 36 and with the holding member 32. The cradle configuration 60 is attached substantially to the first end 54 of the flexible belt 34 below the flexible bracket 36. The purpose of the cradle configuration 60 is to hold an object such as the wire bundle 48 in axial alignment relative to the retainer or harness clamp assembly 30, as is shown in FIGS. 1, 2 and 11.

Referring now to FIGS. 1–3, 4–7, 10 and 14 a housing member 62 and the locking member 46 operatively mounted therein, are disclosed in detail. As is briefly mentioned above and best shown on FIGS. 3 and 6, the locking member 46 comprises a bolt or male screw 44. The bolt or male screw 44 has a threaded portion 64 which is designed to operatively engage the track 42 provided on the flexible belt 34. The locking member 46 has a hexagonally shaped head 66 for tightening by a wrench (not shown). A slot 68 is provided in the head 66 for insertion of a screwdriver (not shown) or like tool.

A substantially cylindrically shaped body 70 of the locking member 46 has a narrower cylindrical portion 72 which is disposed abutting the threaded portion 64. An end of the locking member 46 opposite to the hexagonally shaped head 66 comprises a relatively short cylinder or disc 74. The disc 74 is axially aligned with the rest of the locking member 46 and immediately abuts the narrow cylindrical portion 72. A pair of protrusions or tines 76 shown on FIG. 6, 7 and 14 are disposed on a planar surface 78 of the disc 74. The tines 76 which are spaced at a 180° angular distance relative to one another point in an axial direction toward the hexagonal head 66 of the locking member 46.

In the preferred embodiments of the retainer or harness clamp assembly 30 of the present invention the entire locking member 46 is integrally manufactured from suitable plastic material. The purpose of the above described configuration of the locking member 46 will be readily understood as its mounting to the housing member 62 and the operation of the clamp harness assembly 30 is further described below.

The housing member 62, as is best shown on FIGS. 4, 5 and 14, has a hollow body 80 and a substantially flat mounting flange 82 which is angularly spaced relative to a general longitudinal axis of the body 80. The mounting flange incorporates a circular aperture 83 which is utilized to mount the entire retainer assembly 30 to an assembly rod, or like object. The body 80 itself is best described as having a configuration resembling a half torus, as is shown on FIG. 3.

The body 80 is configured to slideably fit within the flexible bracket 36 below the spacer 56 as is shown in FIGS. 1 and 2. A shoulder or protruberance 84 is provided on each lateral side 86 of the housing member 62. The shoulders or protruberances, 84 only one of which is shown on FIG. 3, are configured to align the housing member 62 in the flexible bracket 36.

An inside hollow portion 88 of the body 80 is best illustrated on FIGS. 4 and 14. A first opening 90 is provided in the body 80 to accomodate the locking member 46 just below the hexagonal head 66. The body 80 of the housing member 62 includes an inner wall 92, which has a second opening 94. The second opening 94 is configured to snappingly receive and accomodate the narrow cylindrical portion 72 of the locking member 46. The inner wall 92 in effect divides the hollow portion 88 of the body 80 into a first 96 and a second compartment 98. It follows from the above description that when the locking member 64 is within the housing member 62, its threaded portion 64 is disposed in the first compartment 96 and the disc 74 is disposed in the second compartment 98.

An indentation or recess 100 is provided in a surface 102 of the inner wall 92 which faces the second compartment 98. The indentation or recess 100 is configured to engage any one of the tines 76. It is readily apparent from the above description and from an inspection of FIGS. 5, 6 and 14 that when the tine 76 is disposed in the indentation 100 a rotating movement of the locking member 46 is restrained. When the retainer or harness clamp assembly 30 tightly embraces an object such as the wire bundle 48, a force exists which attempts to move the locking member 46 in an axial direction as indicated by an arrow 104 on FIGS. 6 and 14. As is elaborated further below, this force locks the retainer or harness clamp assembly 30 in a position tightly embracing the wire bundle 48, and prevents its unintentional disengagement due to vibration or like motion of the retainer assembly 30.

The cross sectional views of FIGS. 5 and 10 further illustrate the above described component parts of the housing member 62 and of the locking member 46 removably mounted thereinto. More particularly, the cross sectional view of FIG. 10 shows the positioning of the disc 74 of the locking member 46 within the second compartment 98 of the housing member 62.

Having described the principal structural components of the first preferred embodiment of the retainer or harness clamp assembly 30 of the present invention, the ensuing description is directed to its mode of operation and to the principal advantages derived from the use thereof.

As is shown in FIGS. 1, 2 and 11, when it is desired to secure an object such as the wire bundle 48 by the retainer or harness clamp assembly 30, the flexible belt 34 of the holding member 32 is looped around the object 48. A free end 106 of the flexible belt 34 is placed into the flexible bracket 36. The housing member 62 incorporating the locking member 46 is also positioned within the flexible bracket 36 in such a manner that the locking member 62 is disposed immediately above the free end 106 of the flexible belt 34.

The locking member 46 is then tightened around the wire bundle 48 by turning the bolt or screw 44 in a clockwise direction. This may be accomplished by using a screwdriver (not shown) or a suitably sized wrench (not shown).

As the bolt 44 turns, its threaded portion 64 engages the track 42 provided on the flexible belt 34. This, in turn, moves the free end 106 of the flexible belt 34 in a direction traverse to the general longitudinal axis of the wire bundle 48.

It is readily understood that a force necessary to turn the bolt 44 substantially increases when the flexible belt 34 tightly embraces the wire bundle 48. As it was briefly discussed above, it is often necessary to eliminate the possibility of damage to the object embraced by the flexible belt 34. Therefore, it is necessary to limit the force which may be applied through the flexible belt 34 to the object 48.

In the present invention the flexible, spring like property of the flexible bracket 36 and the positioning of the housing member 62 within the bracket 36 provide for a release of an excessive tightening force. More specifically, as a predetermined force is reached upon turning of the bolt 44, the bracket 36 flexes to increase the distance between the top surface 40 of the flexible belt 34 and the threaded portion 64 of the locking member 46. This increased distance is readily discernible on FIG. 2, wherein it is designated as a $\Delta$ d. As the tightening force increases further, the threaded portion 64 simply snaps over the engaged ridges 38 of the track 42 whereby the excessive force is released. This feature of the retainer assembly 30 of the present invention eliminates potential damage to the object 48 which might otherwise occur due to subjective over tightening by an operator.

The "self-locking" feature of the retainer or harness clamp assembly 30 of the present invention, which was briefly described above, eliminates an additional source of potential damage to clamped objects such as the wire bundle 48. Vibration, which is particularly common in the hostile environment of an aircraft, often loosens retainer or clamp harness assemblies thereby allowing the clamped wires to continuously rub against one another and against the clamp harness.

In the clamp harness assembly 30 of the present invention, when the desired degree of tightening around the wire bundle 48 is attained, there is a substantial force pushing the locking member 46 in the axial direction shown by the arrow on FIGS. 6 and 14. Either as a result of deliberate positioning by an operator or due to an inadvertent slight turning of the bolt 44, one of the tines 76 engages the recess 100 and the bolt 44 locks into position. Thereafter, a much greater force is necessary to turn the bolt 44 further. Consequently, the retainer assembly 30 becomes essentially fail-proof from loosening due to vibration or like inadvertent forces.

Referring now to FIG. 11 a still further advantage of the retainer or harness clamp assembly of the present invention is disclosed. It was briefly pointed out above that according to standard practice in the aviation industry individual wire harness clamps are mounted on a tree. Because the housing member 62 together with the locking member 46 is physically separable from the holding member 32, it is possible to preassemble a plurality of housing members 62 on a mounting tree or assembly rod 108. Individual holding members 32 may subsequently be mounted to each housing member 62 as the need arises. This feature also allows for disassembly of a single wire bundle 48 from the assembly rod 108 without concomitant need to disassemble the entire tree.

Although the herein described retainer or harness clamp assemblies 30 are eminently suited for use in the aviation industry, it is readily apparent that they may also be used in a multitude of other situations, where the above described versatile and utilitarian features are desired.

The retainer or harness clamp assembly 30 of the first preferred embodiment is readily manufactured from a highly hydrocarbon fluid resistant, hydrophobic, flame retardant polyamide material which is available from the Dupont Company under the tradename Zytel ST801. More specifically, the locking member 46 and the housing member 62 are manufactured from Zytel ST801 which is loaded with approximately 10% by weight glass fibers. Since addition of glass fibers somewhat detracts from the flexibility of Zytel ST801, the flexible belt 34 and the flexible bracket 36 comprise substantially pure Zytel ST801.

The hydrocarbon fluid resistant, hydrophobic quality of the material comprising the retainer assembly 30 is particularly desirable in applications on aircrafts where potential damage due to moisture or spillage of hydraulic fluids must be avoided.

Referring now to FIGS. 12 and 13 respectively, a second and a third preferred embodiment of the flexible bracket 36 of the retainer assembly 30 of the present invention are disclosed. The positioning of the housing member 62 in the bracket 36 of these embodiments is schematically indicated with phantom lines. In each of these embodiments a metal leaf spring respectively indicated as 110 and 112, is incorporated in the bracket 36. The metal spring 110 or 112 provides for the desired flexibility of the bracket 36. The metal spring 110 or 112 also eliminates a potential loss of flexibility due to to fatigue of the plastic material comprising the bracket 36. Moreover, it allows for manufacture of the bracket 36 from plastic materials other than the above described polyamide material. In the third preferred embodiment of the bracket 36, the leaf spring 112 also acts as a spacer to provide for alignment of the housing member 62 at a desired distance from the bracket 36.

What has been described above is a retainer or harness clamp assembly having a plurality of novel, utilitarian features which is particularly suitable for use in the aviation industry. Various modifications of the above described embodiments of the present invention may be readily apparent to those skilled in the arts. Accordingly, the scope of the present invention should be interpreted solely from the following claims.

What is claimed is:

1. A retainer assembly for holding objects such as wire and the like comprising;
   a strap member having a plurality of locking elements;
   a housing member removably and separably connected to the strap member;
   means for connecting the housing member to a support member;
   fastening means operatively connected to the housing member for engagement with the locking elements to adjust the relative position of the strap member about the object, and
   means for releasing the fastening means from engagement with the locking elements at a predetermined force load.

2. The invention of claim 1 wherein the means for releasing includes a flexible bracket mounted about the housing member.

3. The invention of claim 2 wherein the strap member and flexible bracket is integrally molded from a thermoplastic polyamide that has hydrophobic characteristics.

4. The invention of claim 3 wherein one of the housing member and fastening means is molded from a thermoplastic polyamide that has hydrophobic characteristics and has reinforcing glass fibers.

5. The invention of claim 2 further including a spacer member positioned between the flexible bracket and the housing member to permit the flexible bracket to contract upon the application of a force load to release the fastening means.

6. The invention of claim 4 wherein one of the housing member and fastening means has a detent and the other has a locking tine of a complimentary configuration to provide at least one lock position when the fastening means is mounted within the housing member.

7. The invention of claim 2 wherein one of the housing member and fastening means has a detent and the other has a locking tine of a complimentary configuration to provide at least one lock position when the fastening means is mounted within the housing member.

8. The invention of claim 2 wherein one of the housing member and the flexible bracket has a spacer member to position the flexible bracket a distance from the housing member sufficient to permit a relative releasing movement between the strap member and the fastening means at a predetermined force load.

9. The invention of claim 8 wherein the fastening member is a rotatable screw and one of the housing member and rotatable screw has a detent and the other has a locking tine of a complimentary configuration to provide at least one lock position when the fastening means is mounted within the housing member.

10. The invention of claim 1 further including a bracket mounted about the housing member and wherein the means for releasing the fastening means from engagement includes a leaf spring positioned between the bracket and the housing member and having sufficient spring force to only flex at the predetermined force load.

11. The invention of claim 1 wherein the means for connecting the housing member includes a mounting bracket configured to permit mounting on an avionic assembly rod.

12. A retainer assembly for securement of objects comprising;
    a holding member including a housing member for extending around an object;
    a locking member for adjustably tightening the member about the object, and
    means for releasing the locking member from a continual tightening of the holding member at a predetermined force, one of the housing member and locking member has a detent and the other has a locking tine of a complimentary configuration to provide at least one lock position when the locking member is mounted within the housing member.

13. The invention of claim 12 wherein the means for releasing the locking member includes a flexible bracket operatively permitting a releasable relative movement between the holding member and the locking member at a predetermined force.

14. The invention of claim 12 wherein the locking member is a rotatable screw.

15. The invention of claim 12 wherein the holding member is an elongated flexible belt.

16. The invention of claims 13 wherein the holding member includes a housing member mounted within the flexible bracket, one of the housing member and the flexible bracket has a spacer member to position the flexible bracket a distance from the housing member.

17. The invention of claim 14 wherein the rotatable screw further includes a retainer disc with a pair of locking tines.

18. The invention of claim 16 wherein the housing member further includes a mounting flange.

19. The invention of claim 18 wherein the housing member further includes first means for alignment with the flexible bracket.

20. The invention of claim 13 wherein the flexible bracket is U-shaped and includes a support base.

21. The invention of claim 20 wherein the support base further includes a pair of support cradles for supporting an object.

22. The invention of claim 19 wherein the flexible bracket includes second means for cooperative alignment with the first means.

23. The invention of claim 13 wherein the flexible bracket and locking member are molded from a thermoplastic polyamide.

24. The invention of claim 23 wherein the holding member includes a housing member molded from a thermoplastic polyamide and at least one of the housing member and the locking member includes glass fibers.

25. The invention of claim 24 wherein the holding member further includes an elongated flexible belt integrally connected to the housing member.

26. A retainer assembly for securement of objects comprising;
  a holding member for extending around an object;
  a locking member for adjustably tightening the holding member about the object, and
  means for releasing the locking member from a continual tightening of the holding member at a predetermined force including a flexible bracket operatively permitting a releasable relative movement between the holding member and the locking member at a predetermined force, wherein the holding member includes a housing member mounted within the flexible bracket, one of the housing member and the flexible bracket has a spacer member to position the flexible bracket a distance from the housing member.

27. A retainer assembly for securement of objects comprising;
  a holding member for extending around an object;
  a rotatable screw having a retainer disc with a pair of locking tines for adjustably tightening the holding member about the object, and
  means for releasing the rotatable screw from a continual tightening of the holding member at a predetermined force.

28. The invention of claim 27 wherein the holding member includes a housing member, one of the housing member and rotatable screw has a detent and the other has a locking tine of a complimentary configuration to provide at least one lock position when the rotatable screw is mounted within the housing member.

29. The invention of claim 28 wherein a snap locking mounting configuration is provided on the housing member to receive the rotatable screw.

30. A retainer assembly for securement of objects comprising;
  a holding member for extending around an object;
  a locking member for adjustably tightening the holding member about the object; and
  means for releasing the locking member from a continual tightening of the holding member at a predetermined force, including a U-shaped flexible bracket having a support base, the flexible bracket operatively permitting a releasable relative movement between the holding member and the locking member at a predetermined force.

31. A plastic avionic wire clamp assembly for providing a removable lightweight securement of aircraft electrical wires and cable comprising;
  a plastic flexible strap member having a belt portion with a plurality of locking elements and a securement assembly at one side of the belt portion;
  a plastic housing member removably connected to the securement assembly, the housing member providing a passageway between itself and the belt portion to receive one end of the belt portion in a coiled position about an object and further including a first lock configuration, and
  a plastic rotatable fastening member operatively mounted in the housing member for operative contact with the locking elements to adjust the relative position of the belt portion through the passageway, the fastening member having a second complimentary lock configuration which interfaces with the housing member first lock configuration to provide a lock position, wherein the securement assembly further includes means for releasing the fastening member from operative contact with the locking elements at a predetermined force.

32. The invention of claim 31 wherein a snap locking mounting configuration is provided on the housing member to receive the fastening member.

33. The invention of claim 31 wherein the securement assembly further includes a pair of spaced relatively movable mounting members.

34. The invention of claim 33 wherein one of each of the mounting members and the housing member has a pair of detents and the other has protuberants that are complimentary to the respective detents for fastening the mounting members to the housing member.

35. The invention of claim 33 further including an avionic assembly rod for attachment to appropriate aircraft structure, and a mounting bracket extending from the housing member and secured to the assembly rod whereby the housing member can be preassembled on the assembly rod and the strap member can be subsequently removably attached for securing wires and cables.

36. A plastic avionic wire clamp assembly for providing a removable lightweight securement of aircraft electrical wires and cables comprising;
  a plastic flexible strap member having a belt portion with a plurality of locking elements and a securement assembly at one side of the belt portion;
  a plastic housing member removably connected to the securement assembly and reinforced with glass fibers, the housing member providing a passageway between itself and the belt portion to receive one end of the belt portion in a coiled position about an object and further including a first lock configuration;
  a snap locking mounting configuration is provided on the housing member to receive the fastening member, and
  a plastic rotatable fastening member operatively mounted in the snap locking mounting configuration in the housing member for operative contact with the locking elements to adjust the relative position of the belt portion through the passageway, the fastening member having a second complimentary lock configuration which interfaces with the housing member first lock configuration to provide a lock position.

37. The invention of claim 36 wherein the securement assembly further includes means for releasing the fastening member from operative contact with the locking elements at a predetermined force.

38. The invention of claim 37 wherein the means for releasing includes a flexible bracket mounted about the housing member to permit relative movement.

39. An avionic wire clamp assembly for providing a removable lightweight securement of aircraft electrical wires, cables and the like that can be assembled in a plurality of bundles comprising;

an avionic assembly rod for attachment to appropriate internal aircraft structure;

a plurality of retainer assemblies attached to the assembly rod, each capable of respectively securing an individual bundle, each retainer assembly further including a plastic flexible strap member having a belt portion with a plurality of locking elements and a securement assembly at one side of the belt portion, a plastic housing member removably connected to the strap securement assembly, the housing member providing a passageway between itself and the belt portion in a coiled position about a bundle and further including a first lock configuration, a mounting bracket extending from the housing member for attachment to the assembly rod and a plastic rotatable fastening member operatively mounted in the housing member for operative contact with the locking elements to adjust the relative position of the belt portion through the passageway, the fastening member having a second complimentary lock configuration which interfaces with the housing member first lock configuration to provide a fixed rotatable positioning of the fastening member in the housing member, whereby the housing member can be preassembled on the assembly rod and the strap member can be subsequently removably attached for securement of a bundle, thereby permitting selective release of any bundle from the avionic assembly without removing the other retainer assemblies.

40. The invention of claim 39 wherein the securement assembly further includes means for releasing the fastening member from operative contact with the strap locking elements at a predetermined force.

41. The invention of claim 40 wherein the means for releasing includes a flexible bracket mounted about the housing member to permit relative movement for releasing at a predetermined force.

42. The invention of claim 39 wherein a snap locking mounting configuration is provided on the housing member to receive the fastening member.

43. The invention of claim 39 wherein the securement assembly further includes a pair of spaced relatively movable mounting members.

44. The invention of claim 39 wherein one of the housing member and the fastening member has a detent and the other has a locking tine of a complimentary configuration to provide at least one lock position when the fastening member is mounted within the housing member whereby vibration of the clamp assembly will not release the clamping force when the tine and detent are engaged.

* * * * *